United States Patent [19]

Shellhause

[11] Patent Number: 4,753,327
[45] Date of Patent: Jun. 28, 1988

[54] DRUM BRAKE SHOE RETURN SPRING SUPPORT

[75] Inventor: Ronald L. Shellhause, Vandalia, Ohio

[73] Assignee: General Motors Corporation, Detroit, Mich.

[21] Appl. No.: 61,457

[22] Filed: Jun. 15, 1987

[51] Int. Cl.$^4$ .............................................. F16D 65/02
[52] U.S. Cl. .............................. 188/216; 188/106 A; 188/206 R; 267/179
[58] Field of Search ............... 188/78, 79.5 P, 106 A, 188/106 F, 206 R, 216, 325; 267/179

[56] References Cited

U.S. PATENT DOCUMENTS 4,228,876 10/1980 Osborne .......................... 188/216 X
4,471,859 9/1984 Urban ................................. 188/216

Primary Examiner—Duane A. Reger
Attorney, Agent, or Firm—Ernest E. Helms

[57] ABSTRACT

The present invention provides an apparatus and method of utilization of the same of a brake spring support. The support of the present invention provides a head for locating and supporting the spring along with a fixably connected curved tang which is inserted into an aperture of the brake shoe and is cammingly locked to the brake shoe after attachment of the spring.

5 Claims, 1 Drawing Sheet

DRUM BRAKE SHOE RETURN SPRING SUPPORT

FIELD OF THE INVENTION

The field of the present invention is that of vehicle brakes, especially drum type vehicle brakes.

DISCLOSURE STATEMENT

In the leading/trailing shoe design brake, the front and rear brake shoes at the top are held against the wheel cylinder pistons by an upper return spring. Also the front and rear brake shoes are held to a fixed anchor plate by a lower return spring. When the brakes are applied, the wheel cylinder pistons move both brake shoes outward to contact the brake drum. With forward wheel rotation, the forward brake shoe will wrap into the drum and become self energized. With reversed wheel rotation the rear brake shoe is self energized.

As the brake shoe lining wears, to function properly the brake shoes must be adjusted to a position more adjacent to the wheel drum. To provide the adjustment, adjacent to the wheel cylinder and located underneath therewith is a spreader bar which is combined with an adjuster wheel. Upon each application of the brakes, an adjuster lever pushes against the adjuster wheel to automatically adjust the position of the brake shoes. Typically the upper return spring will be located between the wheel cylinder and the spreader bar having one end hooked into an opening of the trailing shoe web and the other end hooked onto a wire form support. The wire form is connected at both ends with the webbing of the leading (forward) brake shoe.

The wire form is bent into a custom shape and must be customized for applications in the left or right brake assembly. Also it is very difficult to automate the assembly of the wire form (commonly referred to as the spring connector link) to the brake shoe web, therefore often the wire form is assembled to the brake shoe web manually.

SUMMARY OF THE INVENTION

To overcome the above noted and other problems the present invention is brought forth. The present invention provides a coil spring support having a head which can support and locate the coil spring at a predetermined distance away from the brake shoe web providing greater clearance between the coil spring and the adjuster mechanisms of the brake assembly. The present invention also has fixably connected to the head a curved tang body which extends through an aperture of the brake shoe web and is cammingly locked to the web after connection with the spring. The present invention provides a coil spring support which can be used on left or right wheel brake assemblies without modification, is easier to assemble to the brake and can be applied to the brake in an automated process. Still further the coil spring support of the present invention is less expensive than the prior wire forms support that it replaces.

It is an object of the present invention to provide an apparatus and a method of utilization of the same of a support for stabilizing and locating a coil spring to the brake shoe web of a brake assembly. It is another object of the present invention to provide a brake shoe coiled spring support which can be used on the left or right hand brake assemblies without modification.

It is another object of the present invention to provide a brake shoe hooked coil spring support for insertion into an aperture of a brake shoe, the support including a head having a central opening for insertion of the coil spring hook and a notch on an end of the head away from the brake shoe to seat the spring hook, and the head having a shoulder adjacent the brake shoe for supporting the head on the brake shoe, and a curved tang body fixably connected with the head adjacent the head shoulder extending into the brake shoe aperture and extending along the brake shoe whereby the spring is supported at a predetermined distance from the brake shoe and whereby the spring causes the tang to be cammingly locked to the brake shoe.

It is another object of the present invention to provide a drum brake shoe hooked coil return spring support for insertion into an aperture of a brake shoe web, the support including a head having a central triangular opening for insertion of the return coil spring hook and a notch on the end of the head away from the brake shoe web to seat the return spring hook, and the head having a shoulder adjacent the brake shoe for supporting the head on the brake shoe web, and a curved tang body integrally connected with the head bifurcating the head shoulder and extending into the brake shoe web aperture and extending along the brake shoe web whereby the return spring is supported at a predetermined distance from the brake shoe web and whereby the return spring causes the tang to be cammingly locked to the brake shoe.

It is another object of the present invention to provide a method of supporting a hooked coil spring on a brake on a support having a head with a central opening, a notch on the end of the head away from the brake, a shoulder on the head adjacent to the brake, and a curved tang body fixably connected to the head adjacent the shoulder and insertable into an aperture of the brake shoe, the method including inserting the curved tang body through the brake aperture, supporting the head on the brake by the shoulders, inserting an end of the spring into the central opening and seating the spring in the notch of the head, and cammingly locking the curved tang body to the brake whereby the spring is supported at a predetermined distance from the brake.

Other objects, desires and advantages of the present invention will become more apparent to those skilled in the art as the nature of the invention is better understood from the accompanying drawings and a detailed description.

DETAILED DESCRIPTION OF THE DRAWINGS

Figure 1:
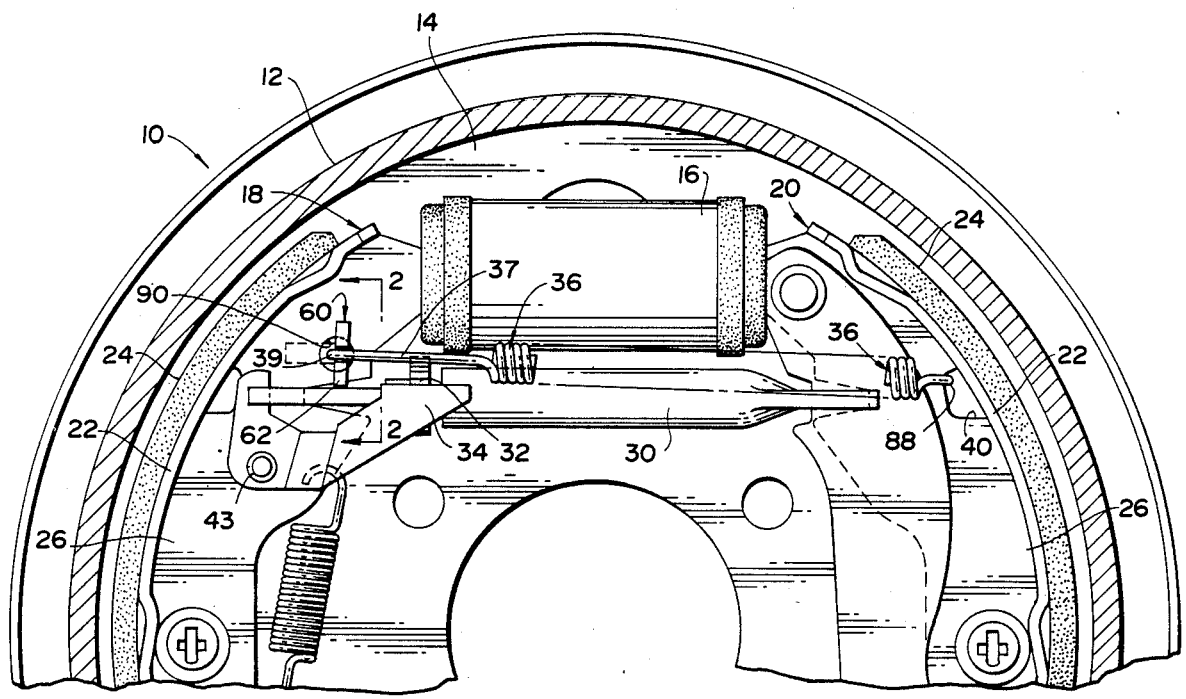
FIG. 1 is a cutaway sectional view mainly in front elevational of the support of the present invention in the environment of a leading trailing brake assembly.
Figure 2:
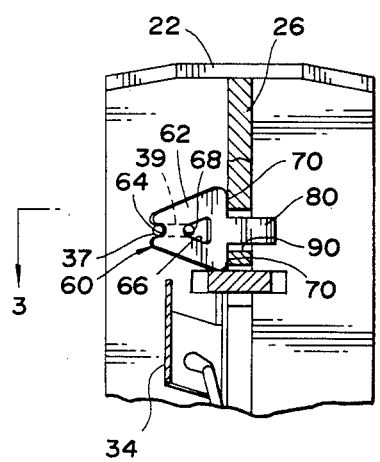
FIG. 2 is a view along lines 2—2 of FIG. 1.
Figure 3:
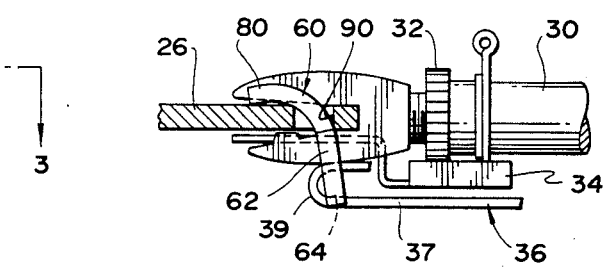
FIG. 3 is a view along line 3—3 of FIG. 2.
Figure 4:
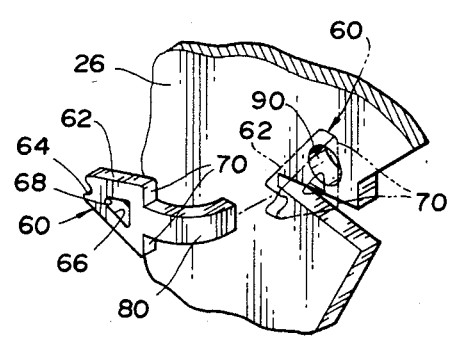
FIG. 4 is an enlarged view illustrating installation of the support of the present invention.

Referring to FIGS. 1, 2, 3 and 4 the brake drum assembly 10 has a drum 12 which is fixably connected to the wheel (not shown) of the vehicle. Fixably connected to the axle flange (not shown) of the wheel is the backing plate 14. The backing plate 14 has fixedly connected thereto a wheel cylinder 16 (commonly referred to as a brake cylinder) typically located towards the upper portion of the drum brake assembly 10. In contact with the pistons (not shown) of the wheel cylinder 16 are the leading and trailing brake shoe assemblies 18 and 20 respectively. Both brake shoe assemblies have a rim 22 for supporting a brake lining 24 and a web 26 generally perpendicular with the rim 22.

The brake shoes pivot on an anchor block (not shown) fixably connected to the back plate 14 towards the lower end of the drum brake brake assembly 10. Along their upper ends the brake shoe assemblies 18 and 20 are separated by combination spreader bar 30 having an adjuster wheel 32 at one end. An adjuster lever 34 is pivotally mounted on a roll pin 43. Adjuster lever 34 is provided for turning the adjuster wheel 32 (also commonly referred to as the adjuster tooth nut) as the brake shoe linings 24 experience wear.

To return the brake shoe assemblies 18, 20 to a nonengaged position after application of the brakes there is provided a lower (not shown) and an upper coil return spring 36. The upper coil return spring 36 has an end 88 hooked to an opening 40 of the trailing brake shoe assembly 20 and extends between the spreader bar 30 and wheel cylinder 16 over the adjuster wheel 34 to the support 60 of the present invention.

The support 60 (FIGS. 2 and 3) has a triangular shape head 62 having a notch 64 on its end away from the web 26. The notch 64 is provided to seat a shank 37 of the coil spring 36. The head also has a triangular central opening 66 for insertion of the hook 39 of the upper return spring 36 and also stabilizes the upper return spring 36 by trapping the spring hook 39 within the apex 68 of the central triangular opening 66.

The head 60 also has adjacent to the web 26 shoulders 70. The shoulders 70 allow the support to be supported and stabilized on the web 26 of the brake shoe assembly 18.

Fixably connected with the head 62 adjacent to and bifurcating shoulder 70 is a curved tang body 80. The curved tang body 80 is inserted (FIGS. 3 and 4) within the aperture 90 of the web 26 and after attachment of the upper return spring 36 will extend and be cammingly locked to the web 26, whereupon the upper return spring 36 will be supported at a predetermined distance away from the web 26. The predetermined distance of support of the upper return spring will usually place the upper return spring 36 away from the web 26 such that the upper return spring 36 will have total clearance with the adjuster wheel 32, adjuster lever 34 and spreader bar 30.

The present invention provides a method of supporting a hooked coil spring 36 on a brake 26 on a support 60 having a head 62 with a central opening 66, a notch 64 on the end of the head 62 away from the brake 26, a shoulder 70 adjacent to the brake 26 and the support having a curved tang body 80 fixably connected to said head 62 adjacent the shoulder 70 and insertable into an aperture 90 of the brake shoe 18, the method including the following steps:

1. Inserting the curved tang body 80 through the brake aperture 90;

2. Supporting the head 62 on the brake 26 by the shoulders 70;

3. Inserting an end 39 of the spring 36 into the central opening 66 and seating the spring in the notch 64 of the head 62;

4. Cammingly locking the curved tang body 80 to the brake 26 whereby the spring 36 is supported at a predetermined distance from the brake 26.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A brake shoe hooked coil spring support for insertion into an aperture of a brake shoe, said support in combination comprising:

a head having a central opening for insertion of said coil spring hook and a notch on an end of said head away from said brake shoe to seat said spring hook, and said head having a shoulder adjacent said brake shoe for supporting said head on said brake shoe; and a curved tang body fixably connected with said head adjacent said head shoulder extending into said brake shoe aperture and extending along said brake shoe whereby said spring is supported at a predetermined distance from said brake shoe and whereby said spring causes said tang to be cammingly locked to said brake shoe.

2. A support as described in claim 1 wherein said central opening is triangular in shape.

3. A support as described in claim 1 wherein said head has a shoulder on both sides of said curved tang body.

4. A drum brake shoe hooked coil return spring support for insertion into an aperture of a brake shoe web, said support in combination comprising:

a head having a central triangular opening for insertion of said return coil spring hook and a notch on the end of said head away from said brake shoe web to seat said return spring hook, and said head having a shoulder adjacent said brake shoe for supporting said head on said brake shoe web; and a curved tang body integrally connected with said head bifurcating said head shoulder and extending into said brake shoe web aperture and extending along said brake shoe web whereby said return spring is supported at a predetermined distance from said brake shoe web and whereby said return spring causes said tang to be cammingly locked to said brake shoe.

5. A method of supporting a hooked coil spring on a brake on a support having a head with a central opening, a notch on the end of the head away from the brake, a shoulder adjacent to the brake, and said support having a curved tang body fixably connected to said head adjacent said shoulder and insertable into an aperture of the brake shoe, said method and combination comprising:

inserting said curved tang body through said brake aperture;

supporting said head on said brake by said shoulders;

inserting an end of said spring hook into said central opening and seating said spring hook in said notch of said head; and cammingly locking said curved tang body to said brake whereby said spring is supported at a predetermined distance from said brake.

* * * * *